(12) United States Patent
Oishi et al.

(10) Patent No.: US 10,165,193 B2
(45) Date of Patent: Dec. 25, 2018

(54) IMAGE PICKUP DEVICE AND FOCAL PLANE SHUTTER

(71) Applicant: SEIKO PRECISION INC., Narashino-shi (JP)

(72) Inventors: Seiichi Oishi, Narashino (JP); Minori Murata, Narashino (JP); Motoharu Sakurai, Narashino (JP); Akira Ito, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 15/062,770

(22) Filed: Mar. 7, 2016

(65) Prior Publication Data

US 2016/0191777 A1 Jun. 30, 2016

Related U.S. Application Data

(63) Continuation of application No. PCT/JP2014/074897, filed on Sep. 19, 2014.

(30) Foreign Application Priority Data

Dec. 6, 2013 (JP) .................... 2013-253507

(51) Int. Cl.
*H04N 5/232* (2006.01)
*H04N 5/225* (2006.01)
(Continued)

(52) U.S. Cl.
CPC ............ *H04N 5/2353* (2013.01); *G03B 9/36* (2013.01); *H04N 5/2253* (2013.01); *G03B 9/62* (2013.01)

(58) Field of Classification Search
CPC ...... H04N 5/2353; H04N 5/2253; G03B 9/36; G03B 9/62
See application file for complete search history.

(56) References Cited

U.S. PATENT DOCUMENTS

| 7,511,391 B2 * | 3/2009 | Kawamoto | ............ H02K 37/14 |
|---|---|---|---|
| | | | 310/40 MM |
| 2003/0012573 A1 | 1/2003 | Sekizawa | |

(Continued)

FOREIGN PATENT DOCUMENTS

| CN | 101236347 A | 8/2008 |
|---|---|---|
| CN | 102053457 A | 5/2011 |

(Continued)

OTHER PUBLICATIONS

International Search Report for International Application No. PCT/JP2014/074897 dated Dec. 22, 2014.

(Continued)

*Primary Examiner* — Timothy J Henn
(74) *Attorney, Agent, or Firm* — Kratz, Quintos & Hanson, LLP

(57) ABSTRACT

An image pickup device includes: an image pickup element; a board including an opening through which light entering the image pickup element passes; a shutter opening and closing the opening; an actuator driving the shutter, and including: a rotor; a stator; and first and second coils wound around the stator and not electrically connected to each other; and a drive circuit including plural terminal portions to which the first and second coils are individually connected.

7 Claims, 7 Drawing Sheets

(51) Int. Cl.
*G03B 9/36* (2006.01)
*G03B 9/62* (2006.01)
*H04N 5/235* (2006.01)

(56) References Cited

U.S. PATENT DOCUMENTS

| | | | | |
|---|---|---|---|---|
| 2004/0036798 | A1* | 2/2004 | Saito | H04N 5/2251 |
| | | | | 348/363 |
| 2004/0047626 | A1* | 3/2004 | Miyazaki | G03B 9/40 |
| | | | | 396/489 |
| 2007/0172231 | A1* | 7/2007 | Durfee | G03B 9/10 |
| | | | | 396/463 |
| 2008/0187304 | A1 | 8/2008 | Hirose | |
| 2011/0010378 | A1 | 5/2011 | Niwamae | |
| 2012/0249849 | A1* | 10/2012 | Nakano | H04N 5/3532 |
| | | | | 348/296 |
| 2014/0010527 | A1* | 1/2014 | Suzuki | G03B 9/36 |
| | | | | 396/469 |
| 2015/0234255 | A1* | 8/2015 | Takahashi | G03B 9/08 |
| | | | | 396/489 |
| 2016/0365782 | A1* | 12/2016 | Li | H02K 21/16 |

FOREIGN PATENT DOCUMENTS

| | | |
|---|---|---|
| JP | 2005-121801 A1 | 5/2005 |
| JP | 2006-154580 A1 | 6/2006 |
| JP | 2006-158139 A1 | 6/2006 |
| JP | 2006-158140 A1 | 6/2006 |
| JP | 2006-201602 A | 8/2006 |
| JP | 2006-246556 A1 | 9/2006 |
| JP | 2006246556 A * | 9/2006 |
| JP | 2007-159173 A1 | 6/2007 |
| JP | 2008-070824 A | 3/2008 |
| JP | 2008-256844 A1 | 10/2008 |
| JP | 2010-181522 A1 | 8/2010 |
| JP | 2011-48079 A1 | 3/2011 |
| JP | 2012-208280 A | 10/2012 |
| WO | WO 02/43227 A1 | 5/2002 |

OTHER PUBLICATIONS

Chinese Office Action dated Jan. 17, 2018, for counterpart Chinese Patent Application No. 201480064714.7 (18 Sheets).

Office Action dated Nov. 7, 2017 for corresponding Japanese Patent Application No. 2013-253507 (6 Sheets, 5 Sheets translation, 11 Sheets total).

Chinese Office Action in corresponding Chinese Application Serial No. 201480064714.7, dated Sep. 14, 2018, including English translation of the pending claims for Office Action No. 2.

\* cited by examiner

IMAGE PICKUP DEVICE AND FOCAL PLANE SHUTTER

CROSS-REFERENCE TO RELATED APPLICATION

This application is a continuation of and claims priority to International Patent Application No. PCT/JP2014/074897 filed on Sep. 19, 2014, which claims priority to Japanese Patent Application No. 2013-253507 filed on Dec. 6, 2013, subject matter of these patent documents is incorporated by reference herein in its entirety.

BACKGROUND (i) Technical Field

The present invention relates to image pickup devices and focal plane shutters.

(ii) Related Art

Japanese Unexamined Patent Application Publication Nos. 2010-181522 and 2008-256844 disclose a focal plane shutter driving a shutter by use of an electromagnet.

In a case of using the actuator as a drive source for driving the shutter, a change in temperature of a coil of the actuator also changes the resistance value of the coil. This might cause an exposure period to vary.

SUMMARY

It is therefore an object of the present invention to provide an image pickup device and a focal plane shutter that suppress variations in an exposure period.

According to an aspect of the present invention, there is provided an image pickup device including: an image pickup element; a board including an opening through which light entering the image pickup element passes; a shutter opening and closing the opening; an actuator driving the shutter, and including: a rotor; a stator; and first and second coils wound around the stator and not electrically connected to each other; and a drive circuit including plural terminal portions to which the first and second coils are individually connected.

According to another aspect of the present invention, there is provided an image pickup device including: an image pickup element; a board including an opening through which light entering the image pickup element passes; a shutter opening and closing the opening; an actuator driving the shutter, and including: a rotor; a stator; and first and second coils wound around the stator and not electrically connected to each other; and drive circuits to which the first and second coils are individually connected.

According to another aspect of the present invention, there is provided an image pickup device including: an image pickup element; a board including an opening through which light entering the image pickup element passes; a shutter opening and closing the opening; an actuator driving the shutter, and including: a rotor; a stator; and first and second coils wound around the stator and electrically connected to each other in parallel; and a drive circuit to which the first and second coils are connected.

According to another aspect of the present invention, there is provided a focal plane shutter including: a board including an opening; a shutter opening and closing the opening; and an actuator driving the shutter, and including: a rotor; a stator; and first and second coils wound around the stator and not electrically connected to each other.

According to another aspect of the present invention, there is provided a focal plane shutter including: a board including an opening; a shutter opening and closing the opening; and an actuator driving the shutter, and including: a rotor; a stator; and first and second coils wound around the stator and electrically connected to each other in parallel.

DETAILED DESCRIPTION

In the following, a description will be given of embodiments.

First Embodiment

Figure 1:
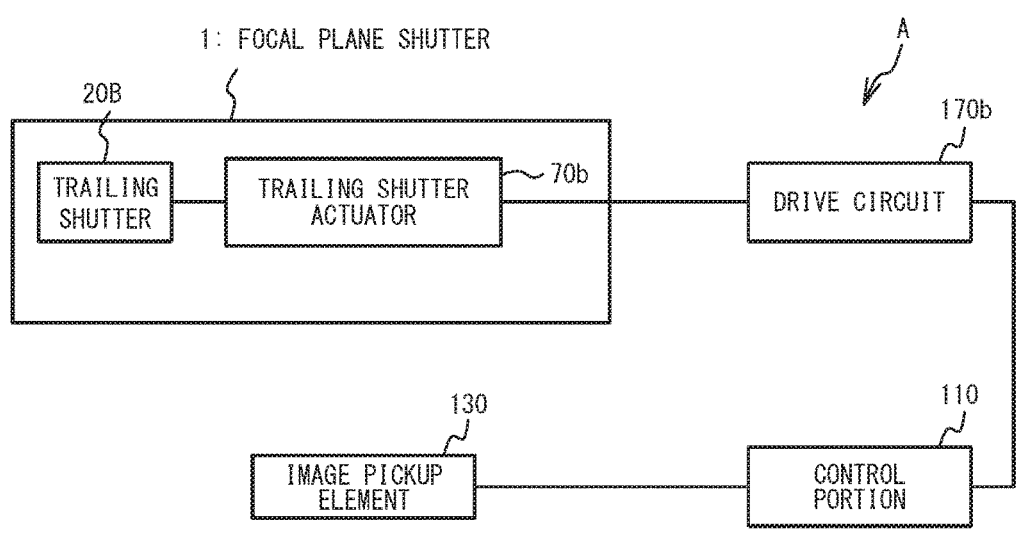
FIG. 1 is a block diagram of a camera including a focal plane shutter.

FIG. 1 is a block diagram of a camera (image pickup device) A including a focal plane shutter 1. The camera A includes the focal plane shutter 1, a control portion 110, an image pickup element 130, and a drive circuit 170b. The focal plane shutter 1 includes a trailing shutter actuator (hereinafter, referred to as actuator) 70b.

The control portion 110 gives a predetermined instruction to the drive circuit 170b. The drive circuit 170b controls the drive of the actuator 70b in accordance with this instruction from the control portion 110. The control portion 110 controls the operation of the whole camera, and includes a CPU, a ROM, and a RAM. The image pickup element 130 is a CMOS. The image pickup element 130 is a light receiving element that converts subject images into electric signals on the basis of photoelectric conversion. Moreover, the camera A includes lenses, not illustrated in FIG. 1, for adjusting a focal length.

The control portion 110 sequentially starts storing charges by sequentially resetting the stored charges in the image pickup element 130 for every pixel line in a predetermined direction. Specifically, the charges sequentially start being stored in the image pickup element 130 at predetermined timing for every pixel line, perpendicular to the movement direction of the trailing shutter 20B, of the image pickup element 130. Therefore, the electronic leading shutter moves from an exposure start position to an exposure end position in a simulated manner. After that, the trailing shutter 20B is moved to close the opening 11 after a predetermined period elapses, so that the charges sequentially finish being stored for every pixel line of the image pickup element 130 and the exposure operation is finished. The camera A is an image pickup device with a so-called electronic leading shutter function.

Figure 2:
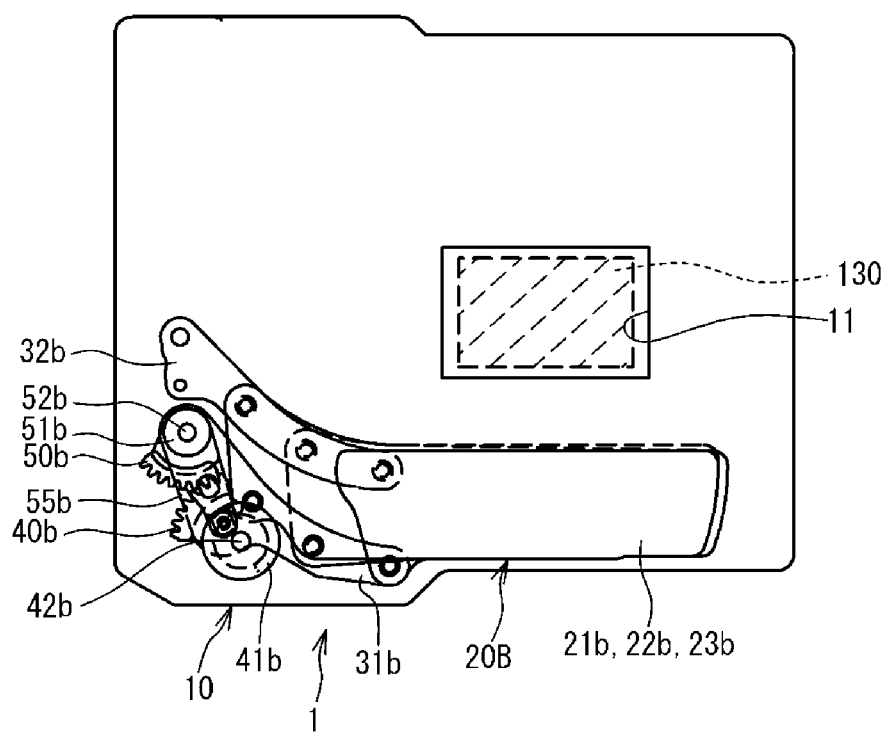
FIG. 2 is a front view of the focal plane shutter.

FIG. 2 is a front view of the focal plane shutter 1. In FIG. 2, the actuator 70b is omitted. The focal plane shutter 1 includes a board 10, a trailing shutter 20B, arms 31b and 32b, and the actuator 70b. The board 10 is provided with a rectangular opening 11. FIG. 2 illustrates an imaging surface of the image pickup element 130 within the opening 11. The light entering the image pickup element 130 passes through the opening 11.

The trailing shutter 20B includes three blades 21b to 23b. In FIG. 2, the trailing shutter 20B is in an overlapped state and recedes from the opening 11. The trailing shutter 20B is connected to the arms 31b and 32b. These arms 31b and 32b are each rotatably supported by the board 10.

The board 10 is provided with a trailing shutter drive lever 55b (hereinafter, referred to as drive lever) for each driving the arm 31b. The drive lever 55b is connected with a gear 50b. The gear 50b engages a gear 40b. The gears 40b and 50b include pipe portions 41b and 51b respectively, and are rotatably supported around spindles 42b and 52b fitting into the pipe portions by the board 10, respectively. Additionally, the spindles 42b and 52b do not have to be always formed on the board 10 in which the opening 11 is formed, and have only to be positionally fixed with respect to the opening 11.

The gear 40b is connected with a rotor of the actuator 70b. The driving of the actuator 70b drives the gears 40b and 50b, thereby driving the drive lever 55b. The driving of the drive lever 55b drives the arm 31b. Thus, the trailing shutter 20B moves. The trailing shutter 20B is movable between a receded position to recede from the opening 11 and a closed position to close the opening 11.

Next, operation of the focal plane shutter 1 will be described. In a wait state, as illustrated in FIG. 2, the trailing shutter 20B is positioned at the receded position, and the opening 11 is maintained in a fully opened state. When a release switch of the camera A is pushed, the control portion 110 performs sensor reset so as to erase the charges stored in the image pickup element 130 at predetermined timing for every pixel line of the image pickup element 130 perpendicular to the movement direction of the trailing shutter 20B from the exposure start position to the exposure end position. In other words, the charges are stored at predetermined timing for every pixel line of the image pickup element 130 perpendicular to the movement direction of the trailing shutter 20B. After a predetermined period elapses from the time when the charges start being stored in the image pickup element 130, the control portion 110 energizes the actuator 70b to cause the trailing shutter 20B to move and close the opening 11. Thus, the charges finish being stored for every pixel line of the image pickup element 130. Additionally, in the present embodiment, the storage of the charges from the exposure start position to the exposure end position for every pixel line of the image pickup element 130 at predetermined timing is referred to as the movement of the electronic leading shutter. After that, when the trailing shutter 20B fully closes the opening 11, the energization of the coil of the actuator 70b is stopped. In such a way, the exposure operation is finished. Herein, the period from the time when the electronic leading shutter starts moving to the time when the trailing shutter 20B closes the opening 11 is referred to as an exposure period. After the exposure operation is finished, the data are output to the RAM of the control portion 110 or a memory of the camera side.

After that, a charging operation starts. In the charging operation, the control portion 110 energizes the actuator 70b to move the trailing shutter 20B away from the opening 11. This brings the opening 11 into the fully opened state as illustrated in FIG. 2, so the wait state is shifted.

Figure 3:
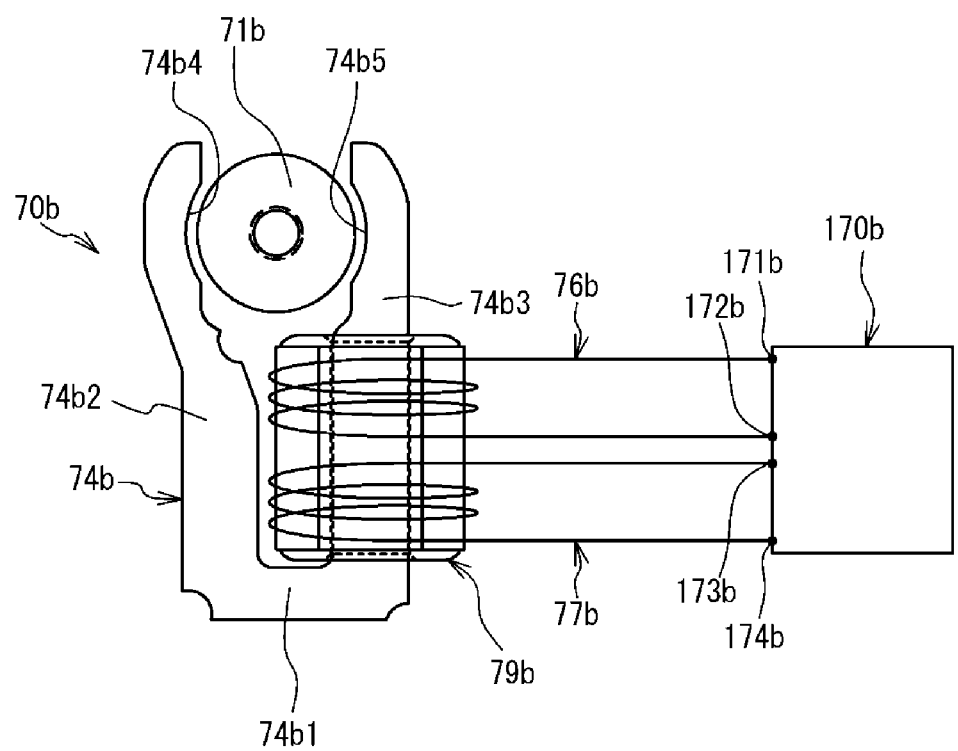
FIG. 3 is an explanatory view of an actuator.

FIG. 3 is an explanatory view of the actuator 70b. The actuator 70b is supported by the board 10. The actuator 70b includes: a rotor 71b rotatably supported by the board 10; a stator 74b energized to exert a magnetic force between the stator 74b and the rotor 71b; and coils 76b and 77b for energizing the stator 74b. The rotor 71b is a permanent magnet magnetized to different polarities in the circumferential direction. The rotor 71b is fixed with the gear 40b. The energization of the coils 76b and 77b rotates the rotor 71b to rotate the gear 40b and the gear 50b. The rotation of the gear 50b causes a drive lever 55b to swing, so the trailing shutter 20B moves. In addition, the reverse energization of the coils 76b and 77b reversely rotates the rotor 71b, so the trailing shutter 20B moves in the opposite direction to the above-mentioned one.

The stator 74b includes: a base portion 74b1; and arm portions 74b2 and 74b3 extending substantially in parallel with each other from respective ends of the base portion 74b1 in substantially the same direction. Distal end portions of the arm portions 74b2 and 74b3 are respectively formed with magnetic pole portions 74b4 and 74b5 facing the rotor 71b. In addition, the two coils 76b and 77b are wound around the arm portion 74b3 through a coil bobbin 79b. Ends of the two coils 76b and 77b are individually connected to terminal portions 171b to 174b of the drive circuit 170b.

The coils 76b and 77b are the same in diameter and also in length. The coils 76b and 77b are not electrically connected to each other. The coils 76b and 77b, wound around the arm portion 74b3 side of the stator 74b, are substantially the same in the number of turns. The coils 76b and 77b may be wound around the arm portion 74b3 in the same direction or in the opposite direction, as long as the energization directions in energizing both the coils 76b and 77b does not offset polarities that are generated in the magnetic pole portions 74b4 and 74b5 by energization. In the present embodiment, the directions in which each current flowing through the coils 76b and 77b are set so as to flow in the same direction around the arm portion 74b3. Additionally, the position where the two coils 76b and 77b are wound is not limited to the arm portion 74b3. For example, any one of the coils 76b and 77b may be wound around the arm portion 74b2, the other may be wound around the arm portion 74b3.

Figure 4:
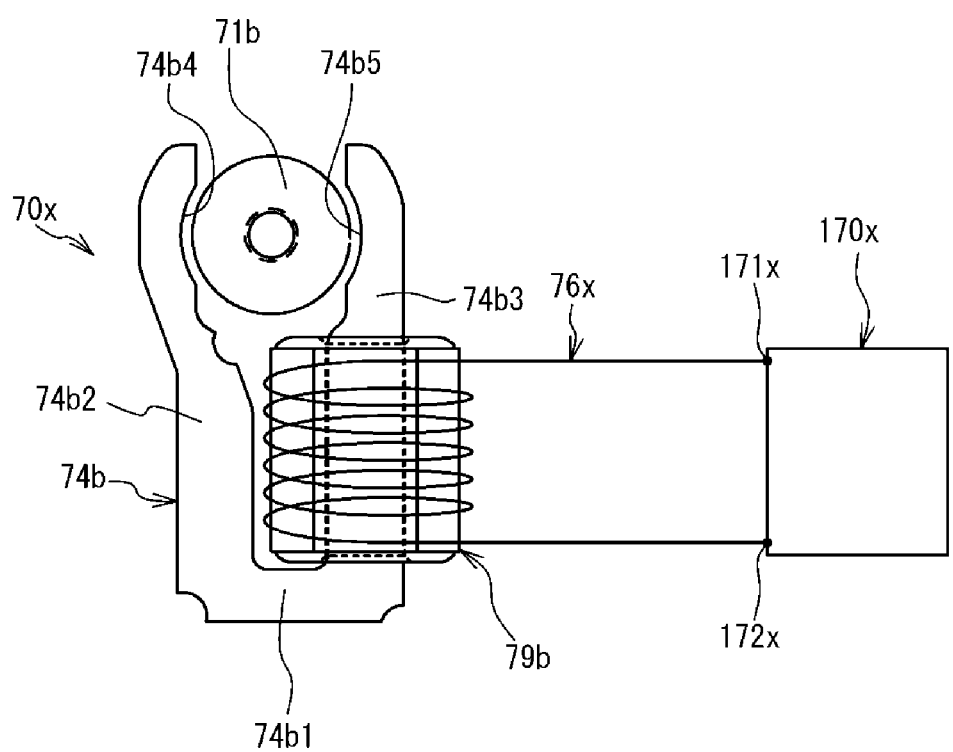
FIG. 4 is an explanatory view of a comparative example of an actuator.

FIG. 4 is an explanatory view of an actuator 70x of a comparative example. As for the actuator 70x, similar components of the actuator 70b are designated with similar reference numerals and a description of those components will be omitted. In the actuator 70x, a single coil 76x is wound around the arm portion 74b3 side of the stator 74b. Both ends of the coil 76x are respectively connected to terminal portions 171x and 172x of a drive circuit 170x. The number of turns of the coil 76x is the same as the total number of turns of the coils 76b and 77b. In addition, the resistance value of the coil 76x is the same as the total resistance value of the coils 76b and 77b. In addition, the voltage applied to the coil 76x is adjusted such that the value of the current flowing through the coil 76x is the same as each value of the current flowing through the coils 76b and 77b. Specifically, the voltage applied to the coil 76x is twice as high as each voltage applied to the coils 76b and 77b. Thus, the ampere-turn of the coil 76x is the same as the total ampere-turn of the coils 76b and 77b. Therefore, the actuator 70x is substantially the same as the actuator 70b in torque.

Figure 5A:
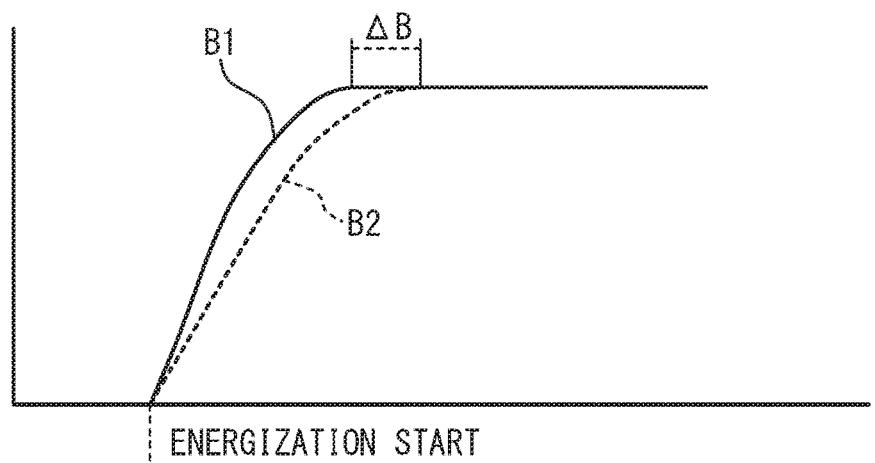
FIG. 5A is a graph indicating a change in a current value after a coil of the actuator starts being energized.
Figure 5B:
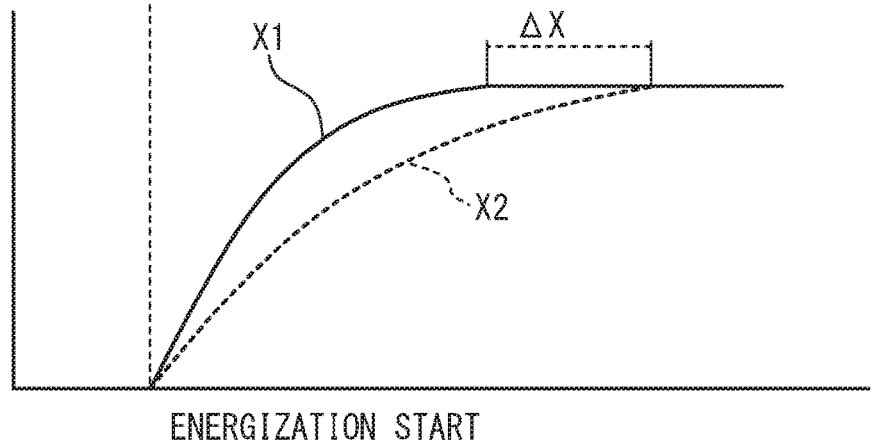
FIG. 5B is a graph indicating a change in a current value after a coil of the actuator of the comparative example starts being energized.

FIG. 5A is a graph illustrating a change in a current value from the time when the coil 76b of the actuator 70b starts being energized. FIG. 5B is a graph illustrating a change in a current value from the time when the coil 76x of the actuator 70x of the comparative example starts being energized. A curve B1 indicates a value of the current flowing through the coil 76b. Incidentally, the coil 77b is the same as the coil 76b in the number of turns, in the resistance value, in the applied current value, and in the applied voltage value. For this reason, a value of the current flowing through the coil 77b is also changed as indicated by the curve B1. A curve X1 indicates a value of the current flowing through the coil 76x. As indicated by the curves B1 and X1, there are time lags from when the energization starts to when a current value reaches the desired current value. The time lag in the actuator 70b is shorter than that in the actuator 70x. This is because the resistance value of the coil 76b is smaller than that of the coil 76x and it is easier to cause the current to flow through the coil 76b than the coil 76x. Therefore, as compared with the case of the actuator 70x using the coil 76x, in the case of the actuator 70b using the coils 76b and 77b, the torque at the desired current value is reached for short time. This reduces the period from the time when the energization starts to the time when the trailing shutter 20B starts moving.

B2 and X2 illustrated in FIGS. 5A and 5B respectively indicate values of current flowing through the coils 76b and 76x of the actuators 70b and 70x in a high temperature environment. As illustrated in FIGS. 5A and 5B, in each case, a time lag from when the energization starts to when a current value reaches the desired current value is increased after high temperature. This is because, in general, an increase in temperature of a coil increases a resistance value, so the current hardly flows.

Here, the change amount ΔB illustrated in FIG. 5A indicates the change amount of the rising period from when the current starts being applied to the coil 76b to when a current value flowing through the coil 76b reaches the desired current value. Similarly, the change amount ΔX illustrated in FIG. 5B indicates the change amount of the rising period from when the current starts being applied to the coil 76x to when a current value flowing through the coil 76x reaches the desired current value. The change amount ΔB is smaller than the change amount ΔX. This reason is supposedly as follows. Since the resistance value of the coil 76b is smaller than that of the coil 76x by the number of turns of the coil 76x, the change amount of the resistance value of the coil 76b due to the change in the temperature is smaller than that of the resistance value of the coil 76x, when both temperatures of the coils 76b and 76x change to the same degree.

The temperatures of the coils 76b and 76x also change in such a way, when the actuators 70b and 70x are driven multiple times. Thus, for example, the actuators 70b and 70x are driven multiple times by continuous shooting or the like, the temperatures of the coils 76b and 76x supposedly increase to the same degree. In this case, the change amount ΔB of the rising period of the current flowing through the coil 76b is smaller than the change amount ΔX. For this reason, as compared with the comparative example, the present embodiment suppresses the change in the period from the time when the energization starts to the time when the trailing shutter 20B starts moving.

Thus, the present embodiment can suppress the variations in the exposure period caused by the temperature change. When using the electronic leading shutter, the moving speed of the electronic leading shutter is not changed by the temperature change in use environment. For this reason, the main cause of the variations in the exposure period might be the change in the period from when the energization starts to when the trailing shutter 20B starts moving. However, the actuator 70b uses two coils 76b and 77b in the present embodiment, thereby suppressing the change in the moving speed of the trailing shutter 20B and the variations in the exposure period even when using the electronic leading shutter.

Additionally, although the control portion 110 energizes both the coils 76b and 77b in the exposure operation, the control portion 110 may energize one of the coils 76b and 77b in the charging operation. This is because the exposure operation requires the fast moving speed of the trailing shutter 20B, but the charging operation does not require the moving speed of the trailing shutter 20B. This can suppress the power consumption. In addition, in the continuous shooting mode, the coils 76b and 77b may both be energized even in the charging operation.

Figure 6A:
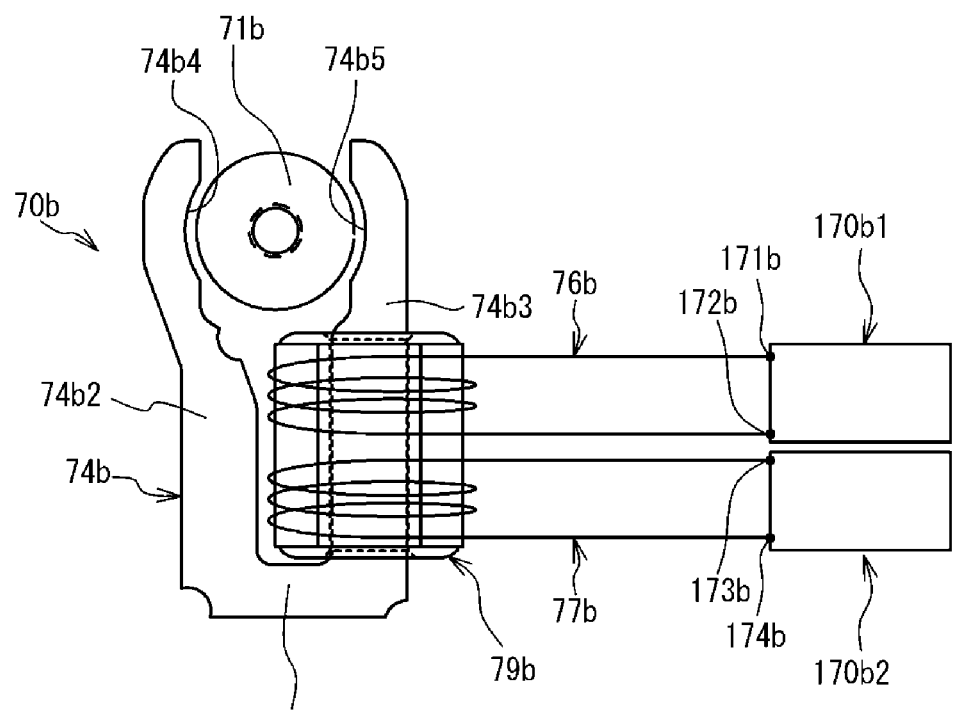
FIGS. 6A and 6B are explanation views of variations of actuators.
Figure 6B:
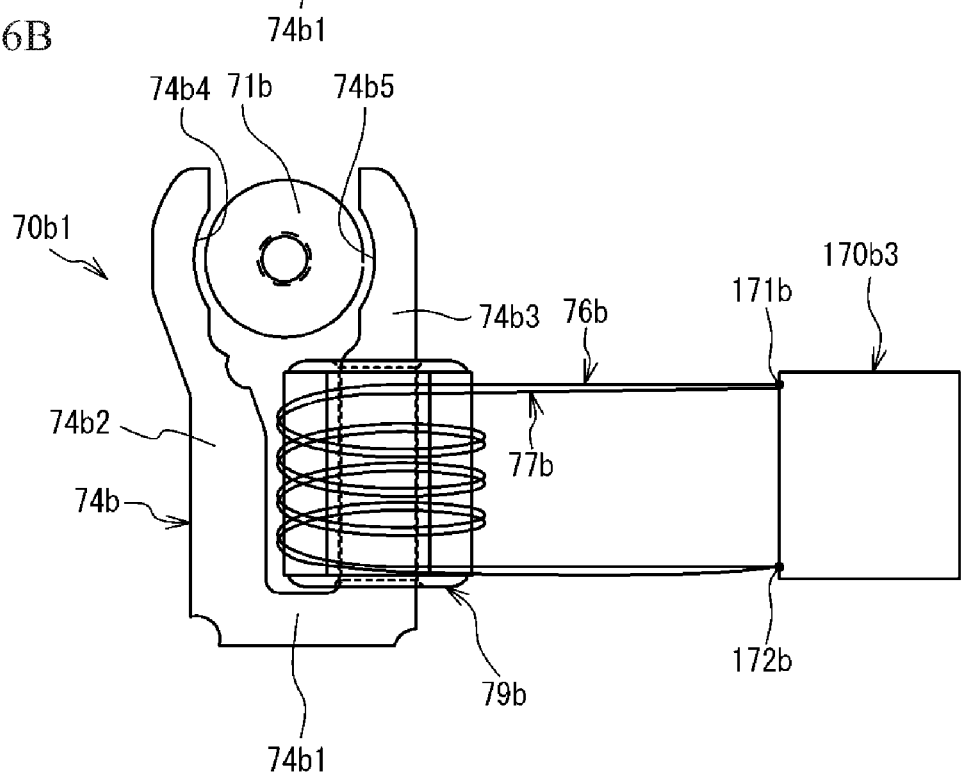

FIGS. 6A and 6B are explanatory views of variations. As illustrated in FIG. 6A, the coils 76b and 77b are respectively connected to individual drive circuits 170b1 and 170b2. Specifically, both ends of the coil 76b are respectively connected to the terminal portions 171b and 172b of the drive circuit 170b1, and both ends of the coil 77b are respectively connected to the terminal portions 173b and 174b of the drive circuit 170b2. Also, the drive circuits 170b1 and 170b2 are controlled by the control portion 110. Such a configuration can also suppress the change in the moving speed of the trailing shutter 20B and the variations in the exposure period.

Incidentally, one end and the other end of the coil 76b may be respectively wound around two projecting portions formed in the coil bobbin 79b, and one end and the other end of the coil 77b are respectively wound around the other two projecting portions formed in the coil bobbin 79b. In this case, through the single focal plane shutter 1, it can be confirmed that the two coils 76b and 77b not electrically connected to each other are wound around the stator 74b.

As illustrated in FIG. 6B, the coils 76b and 77b wound around the stator 74b of an actuator 70b1 are connected to each other in parallel and to a drive circuit 170b3. Therefore, the drive circuit 170b3 is provided with only the two terminal portions 171b and 172b. One ends of the coils 76b and 77b are connected to the terminal portion 171b, and the other ends of the coils 76b and 77b are connected to the terminal portion 172b. Such a configuration can also suppress the change in the moving speed of the trailing shutter 20B and the variations in the exposure period.

Incidentally, one ends of the coils 76b and 77b, wound around the projecting portion or the like of the coil bobbin 79b, may be electrically connected to each other, and the other ends of the coils 76b and 77b, wound around the other projecting portion or the like of the coil bobbin 79b, may be electrically connected to each other. In this case, through the single focal plane shutter 1, it can be confirmed that the two coils 76b and 77b electrically connected in parallel are wound around the stator 74b.

Figure 7A:
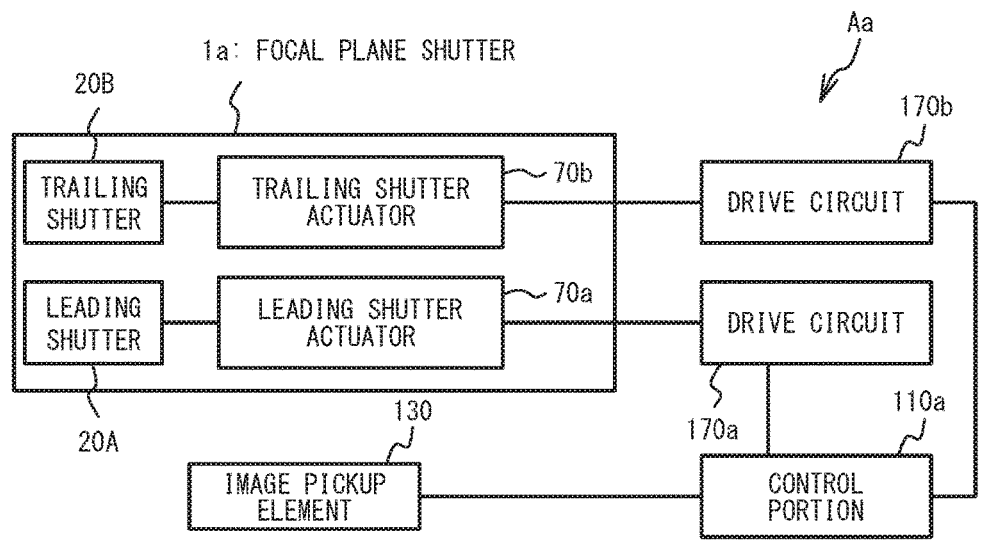
FIGS. 7A and 7B are block diagrams of cameras in variations of the actuators.

FIG. 7A is a block diagram of a camera Aa according to a variation. The camera Aa includes a focal plane shutter 1a, a control portion 110a, and a drive circuit 170a. The focal plane shutter 1a includes a leading shutter 20A and a leading shutter actuator 70a (hereinafter referred to as actuator) for driving the leading shutter 20A. The drive circuit 170a controls the drive of the actuator 70a in accordance with the instruction from the control portion 110a. The camera Aa does not use the electronic leading shutter, but uses the mechanical leading shutter 20A. Such a case of using the leading shutter 20A and the actuator 70a can also suppress the change in the moving speed of the trailing shutter 20B caused by the changes in the temperatures of the coils 76b and 77b, thereby suppressing the variations in the exposure period.

Incidentally, like the actuator 70b, a case where the actuator 70a uses two coils can also suppress the variations in the exposure period. In this case, the two coils of the actuator 70a are not always the same as the two coils 76b and 77b of the actuator 70b in temperature. Thus, even in such a case, the exposure period might vary somewhat. However, it is possible to suppress the change amount of each moving speed of the leading shutter 20A and the trailing shutter 20B caused by the changes in the temperatures, thereby suppressing the variations in the exposure period. Also, it is possible to suppress a decrease in the moving speed for both the leading shutter 20A and the trailing shutter 20B, thereby suppressing a decrease in the shutter speed.

Further, the actuator 70a may use the two coils as described above, and the actuator 70b may use a single coil. This case can also suppress the variations in the moving speed of the leading shutter 20A and the variations in the exposure period.

Figure 7B:
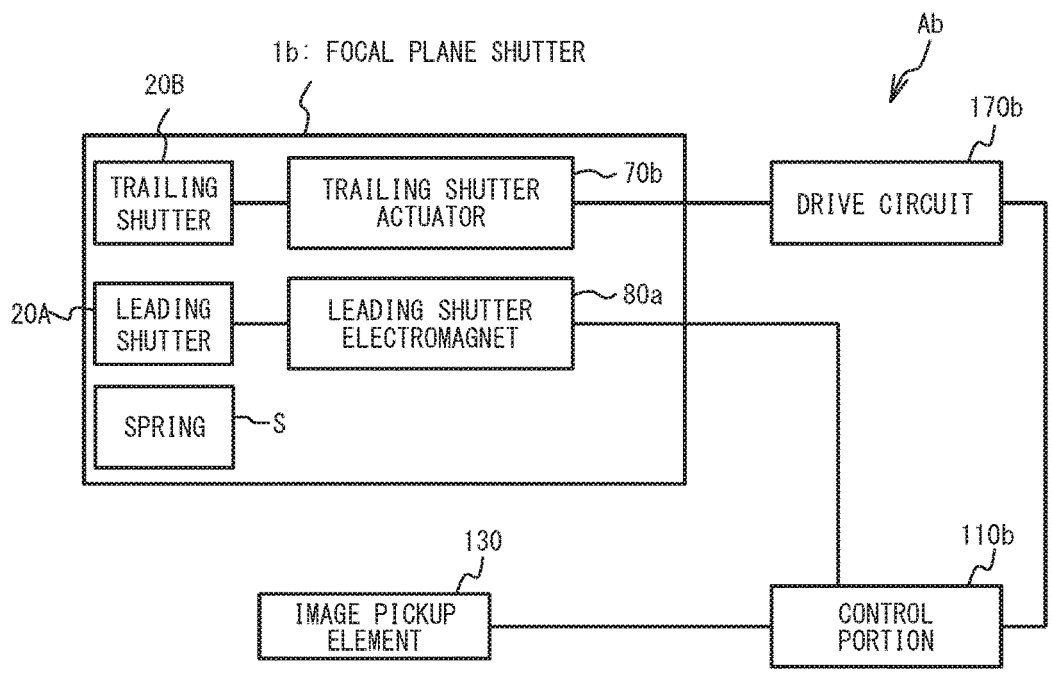

FIG. 7B is a block diagram of a camera Ab according to a variation. The camera Ab includes a focal plane shutter 1b, and a control portion 110b. The focal plane shutter 1b includes the leading shutter 20A, a spring S, and a leading shutter magnet (hereinafter, referred to as electromagnet) 80a. The leading shutter 20A is biased by the spring S in such a direction as to recede from the opening 11. The electromagnet 80a maintains the leading shutter 20A in a state of closing the opening 11 based on the electromagnetic force, in a state where the leading shutter 20A closes the opening 11. Specifically, a drive lever for driving the leading shutter 20A is biased by the spring S. Further, the drive lever is provided with an iron piece capable of being adsorbed on the electromagnet 80a.

When the electromagnet 80a is energized, the iron piece of the drive lever is adsorbed on and held by the electromagnet 80a against the biasing force of the spring S. When the energization of the electromagnet 80a is stopped, the leading shutter 20A is moved away from the opening 11 by the biasing force of the spring S. Also, the focal plane shutter 1b is provided with a non-illustrated set lever that drives the drive lever to cause the iron piece of the drive lever to come into contact with the electromagnet 80a. Such a configuration can also suppress the change in the moving speed of the trailing shutter 20B and the variations in the exposure period.

Further, the above-described cameras Aa and Ab may use the configuration illustrated in FIG. 6A or the configuration illustrated in FIG. 6B.

The coils 76b and 77b may be different in at least one of length, diameter, and resistance value. This is because this case can also suppress the variations in the exposure period, as compared with the case of driving the shutter only by a single coil.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be used in an optical apparatus such as a still camera or a digital camera.

Although blades that are made of a synthetic resin has been described in the present embodiment, blades may be made of a thin-shaped metal.

In the above embodiment, the trailing shutter is composed of three blades, but not limited to this.

What is claimed is:

1. An image pickup device comprising:
an image pickup element;
a board including an opening through which light entering the image pickup element passes;
a shutter opening and closing the opening;
an actuator driving the shutter, and including: a rotor; a stator; and first and second coils wound around the stator and electrically connected to each other in parallel; and
a drive circuit to which the first and second coils are connected,
wherein
the stator includes: a base portion; arm portions extending substantially in parallel with each other from respective ends of the base portion in substantially a same direction,
the first and second coils are wound around one of the arm portions, and
the drive circuit controls the first and second coils in response to an operation state of the shutter.

2. The image pickup device of claim 1, wherein
the stator includes first and second magnetic pole portions sandwiching the rotor and facing the rotor, and
energization of the first and second coils causes the first and second magnetic pole portions to have different polarity from each other.

3. The image pickup device of claim 1, comprising a control portion causing an electronic leading shutter to move in a simulated manner by sequentially resetting stored charges in the image pickup element for every pixel line in a predetermined direction,
wherein the shutter is a trailing shutter.

4. The image pickup device of claim 1, wherein
the shutter is one of a leading shutter and a trailing shutter,
the other of the leading shutter and the trailing shutter is maintained at a predetermined position by an electromagnet and is moved by biasing force of a spring.

5. The image pickup device of claim 1, wherein
the shutter is one of a leading shutter and a trailing shutter,
the other of the leading shutter and the trailing shutter is driven by another actuator different from the actuator.

6. A focal plane shutter comprising:
a board including an opening;
a shutter opening and closing the opening; and
an actuator driving the shutter, and including:
a rotor;
a stator; and
first and second coils wound around the stator and electrically connected to each other in parallel,
wherein one ends of the first and second coils wound around the stator are electrically connected to each other, and
wherein other ends of the first and second coils wound around the stator are electrically connected to each other.

7. An image pickup device, comprising:
an image pickup element;
a board including an opening through which light entering the image pickup element passes;
a shutter opening and closing the opening;
an actuator driving the shutter, and including:
a rotor;
a stator having arm portions; and
first and second coils wound around the stator and electrically connected to each other in parallel; and a drive circuit to which the first and second coils are connected, wherein the first and second coils are wound around one of the arm portions, wherein one ends of the first and second coils wound around the arm of the stator are electrically connected to each other, and wherein other ends of the first and second coils wound around the arm of the stator are electrically connected to each other.

* * * * *